United States Patent [19]

Sharon

[11] Patent Number: 4,595,334
[45] Date of Patent: Jun. 17, 1986

[54] ROBOTIC APPARATUS WITH IMPROVED POSITIONING ACCURACY

[75] Inventor: Andre Sharon, Stamford, Conn.

[73] Assignee: International Business Machines Corporation, Armonk, N.Y.

[21] Appl. No.: 572,086

[22] Filed: Jan. 18, 1984

[51] Int. Cl.$^4$ .............. B66C 1/00; B25J 11/00; B25J 15/00; B25J 17/02
[52] U.S. Cl. .................. 414/735; 414/730; 414/732; 901/29; 901/37; 901/45
[58] Field of Search .............. 901/29, 37, 45; 414/730, 732, 735

[56] References Cited

U.S. PATENT DOCUMENTS

| Re. 31,581 | 5/1984 | Richter | 414/730 |
| 3,888,362 | 6/1975 | Fletcher | 414/730 |
| 4,402,053 | 8/1983 | Kelly | 414/730 |
| 4,459,898 | 7/1984 | Harjar | 414/730 |

FOREIGN PATENT DOCUMENTS

| 831606 | 5/1981 | U.S.S.R. | 414/730 |
| 906687 | 2/1982 | U.S.S.R. | 414/730 |

Primary Examiner—Douglas Hart
Attorney, Agent, or Firm—Wolmar J. Stoffel

[57] ABSTRACT

A robotic apparatus having five degrees of movement with a mounting plate, a first stage platform movably mounted on the mounting plate to shift in the X direction, and also rotate about the X axis, a second stage platform movably mounted on the first stage platform to shift in the Y direction, and also rotate about the Y axis, a third stage platform movably mounted on the second stage platform to move in the Z direction, and powering means to move and rotate the aforementioned elements in the manner described.

10 Claims, 6 Drawing Figures

ROBOTIC APPARATUS WITH IMPROVED POSITIONING ACCURACY

BACKGROUND OF THE INVENTION

1. Field of the Invention

The present invention relates to positioning apparatus, more particularly programmable robotic apparatus where precise positioning of a manipulator means relative to a workpiece or reference is required. More particularly the invention relates to a movable stage that can be attached to and carried by the manipulator means of a conventional robot which enhances the operation of the overall combination by overcoming the inherent position inaccuracies of a relatively massive machine required to displace work holders to large distances.

2. Description of Prior Art

As more and more industrial robots find their way to the manufacturing floor, it is becoming evident that two major disadvantages are lack of speed and positioning accuracy which in many cases are universally related. While great advances have been made in their "intelligence" and electronics, very little has been done to improve accuracy.

Although robots provide greater versatility and large range of motion, they cannot compete with hard automation when it comes to accuracy and speed. If a robot is made stiffer and heavier for increased accuracy, speed is usually sacrificed and vice versa. While many robot manufacturers boast of their high repeatability, they rarely release any accuracy specifications. Needless to say, accuracy is not very good. Many are only accurate to within one-hundred thousandth of an inch.

Repeatability and accuracy are distinguished in the following manner: if a robot is physically moved to a point in space and consequently taught that point, it would be capable of always returning to the same point within a given tolerance known as "repeatability specification". On the other hand, if the robot is programmed to move a calculated destination in its coordinate system, the deviation from the command position is referred to as "accuracy".

Most commercially available manipulators receive position feedback from encoders or potentiometers located at each joint. Thus the absolute end point position is derived from various joint displacements. If there is a slight measurement error associated with the encoders, it is greatly amplified through the length of each link, resulting in a large end point error.

Another cause of positioning errors is beam bending. When a link is subjected to external loads or inertial forces, it usually bends, causing the end point to deviate from the predicted value. Beam bending gives rise to both static errors and dynamic oscillatory errors.

There are many industrial operations in which success relies on the high repeatability of the robot. Several critical points are taught the system and the manipulator repeats the task time and again. This is practical only when there are a few points to which the robot must travel, as in stacking parts on a common axis. Nevertheless there is an enormous amount of applications where high accuracy is necessary to accomplish the job. In drilling and riveting applications, parts must often be manufactured according to a print with numerous holes dimensioned from a certain reference line. In a flexible manufacturing system with the intended capability of efficiently handling small production runs, it is impractical to re-teach numerous points each time the part changes. The position of these holes are programmed into the computer, and the robot is commanded to move to those points to within a slight tolerance. Thus, high accuracy is a must.

One way of reducing bending in a link is by increasing the cross-sectional moment of inertia. The easiest way of doing this is by simply increasing the cross-sectional area; in other words, using a thicker link. Unfortunately, this implies a larger mass and speed is greatly sacrificed. One technique for increasing the accuracy of a robot that is designed for a large range of motion in which great bending moments are created is to provide a local support in the vicinity of the task location. Prior to beginning the operation, the robot would attach itself to the support and thus obtain a reference location close to the work operation. However, the support theory has disadvantages. A local support must be provided for each point where an operation is to be performed. If there are numerous such points, it becomes extremely difficult to carry out this mode of operation. Further, different supports must be provided for different production runs.

SUMMARY OF THE INVENTION

It is an object of this invention to provide a robotic apparatus combination that can displace relatively large and heavy objects or tools over long distances and yet provide a accurate final positioning of the object or tool.

Yet another object of this invention is to provide an automated robotic apparatus wherein a secondary robot in combination with a primary robot provides an accurate final positioning of a work holder or tool.

In accordance with the present invention there is provided in a robotic apparatus which includes a primary robot provided with a manipulator means for support and displacement of a holder or tool, a locating sensor to detect the relative or absolute position of the holder and tool, the improvement being a secondary robot mounted on the manipulator means and supporting the holder or tool, the secondary robot adapted to move the holder or tool to at least 5 degrees of movement in response to output from the locating sensor, the secondary robot including the mounting plate, a first stage platform movably supported on the mounting plate, a first means to support and rotate the first stage platform relative to the mounting plate about its translational axis X and also move longitudinally in the X direction, a second stage platform supported on the first stage platform, a second means to support and rotate the second stage platform relative to the first stage platform abut a translational axis Y and also move longitudinally in the Y direction, and a third stage platform supported on the second stage platform, and a third means to support and move the third stage platform in a Z direction relative to the second stage platform. The secondary robot is capable of moving a work holder or tool to 5 degrees of movement i.e. the X, the Y and the Z directions and also rotational movement about 2 axes which are orthogonal to each other.

Other objects and a more complete understanding of the invention may be had by referring to the following specification and claims taken in conjunction with the accompanying drawings in which FIG. 1 is a schematic view illustrating the overall combination of the invention including a primary robot, a secondary robot, and a sensor.

FIG. 2 is a schematic view of a typical control means used to actuate the various elements of the invention.

One way of reducing bending in a link is by increasing the cross-sectional moment of inertia. The easiest way of doing this is by simply increasing the cross-sectional area, in other words, using a thicker link. Unfortunately, this implies a larger mass and speed is greatly sacrificed. The robot becomes a little more than a fancy machine tool. One technique for increasing the accuracy of the robot that is designed for a large range of motion in which great bending moments are created is to provide a local support in the vicinity of the task location. Prior to beginning the operation the robot would attach itself to the support and thus obtain a reference location close to the work operation. However, the support theory has disadvantages. A local support must be provided for each point where an operation is to be performed. If there are numerous such points, it becomes extremely difficult to provide the required support. Further, different supports must be provided for different production runs.

SUMMARY OF THE INVENTION

It is an object of this invention to provide a robotic apparatus combination that can displace relatively large and heavy objects or tools over long distances and yet provide a precise final positioning of the object or tool.

Yet another object of this invention is to provide an automated robotic apparatus wherein a secondary robot in combination with a primary robot provides a precise final position of a work holder or tool. In accordance with the present invention there is provided in a robotic apparatus which includes a primary robot provided with a manipulator means to support and displace a holder or tool, a locating sensor to detect the relative position of the holder and tool, the improvement being a secondary robot mounted on the manipulator means and supporting the holder or tool, the secondary robot adapted to move the holder or tool through at least 5° of movement in response to output from the locating sensor, the secondary robot including a mounting plate, a first stage platform movably supported on the mounting plate, a first means to support and move a first stage platform relative to the mounting plate above a translational axis in an X direction and also longitudinally in the X direction, a second stage platform supported on the first stage platform, a second means to support and move the second stage platform relative to the first stage platform about a translational axis in a Y direction, and also longitudinally in the Y direction, and a third stage platform supported on the second stage platform, and a third means to support and move the third stage platform in a V direction relative to the second stage platform. The secondary robot is capable of moving a work holder or tool through 5° of movement i.e., the X, the Y, and the Z directions and also rotational movement about two axes which are orthogonal to each other.

Other objects and a more complete understanding of the invention may be had by referring to the following specification and claims taken in conjunction with the accompanying drawings in which FIG. 1 is a schematic view illustrating the overall combination of the invention including the primary secondary robot and the sensor.

DESCRIPTION OF PREFERRED EMBODIMENT

Figure 1:
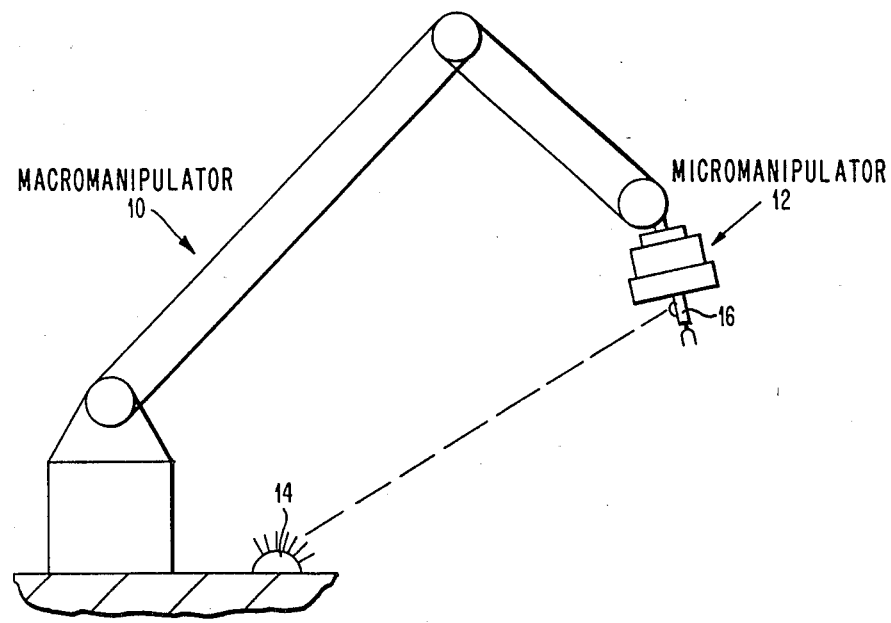

Referring to the Figs. of the drawing and FIG. 1 in particular, there is illustrated the overall combination employing applicant's invention. FIG. 1 shows in schematic form a primary robot or macromanipulator 10 supporting micro manipulator or secondary robot 12 which will be described in more detail, in turn supporting a tool or work holder 13. A sensor 14 is schematically illustrated which senses the precise position of work holder or tool 13. The macromanipulator or primary robot 10 can be of any suitable type capable of moving and manipulating a work holder 13. It can be any one of the four basic geometry schemes i.e. cartesian, which lets each arm section move strictly in an X, Y or Z planar motion, cylindrical, which rotates a cartesian setup about an axis, polar, which rotates a pivoting and length-adjustable arm about the axis, and revolute, which rotates a multiple jointed arm about an axis. The primary robot normally contains a support for the secondary robot 12 which is capable of providing rotational movement about a Z axis. This articulated support is not shown in FIG. 1, but is conventional in the art. Sensor 14 is shown schematically. Any suitable sensor capable of detecting the relative location of the work holder or tool to a reference is suitable for use in practice of the invention. The sensor can be mounted a base as shown in FIG. 1 or could conceivably be mounted on the secondary robot 12 in position to view the workpiece to be worked on or manipulated. Preferably the sensor is a single sensor capable of detecting position relative to five degrees of motion, or a combination of sensors. In use, sensor 14 through suitable software is capable of sensing and adjusting the position of work holder 13 through the action of secondary robot 12 to the precise desired position.

Figure 3:
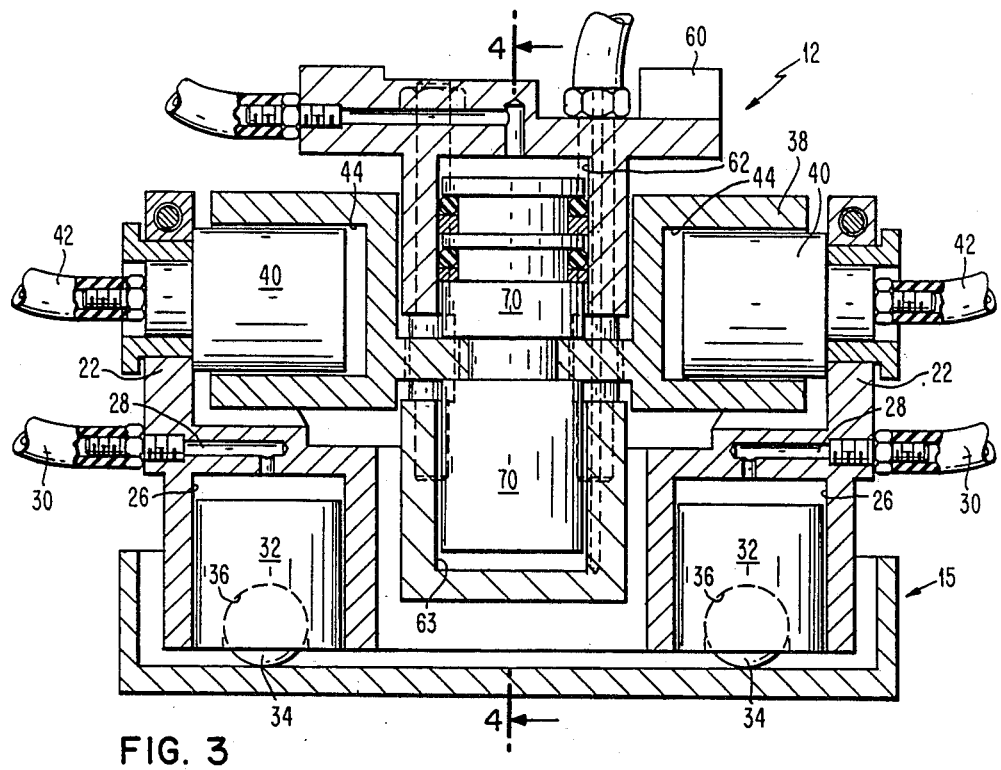
FIG. 3 is an elevational view, in section, of the robot apparatus of the invention.
Figure 4:
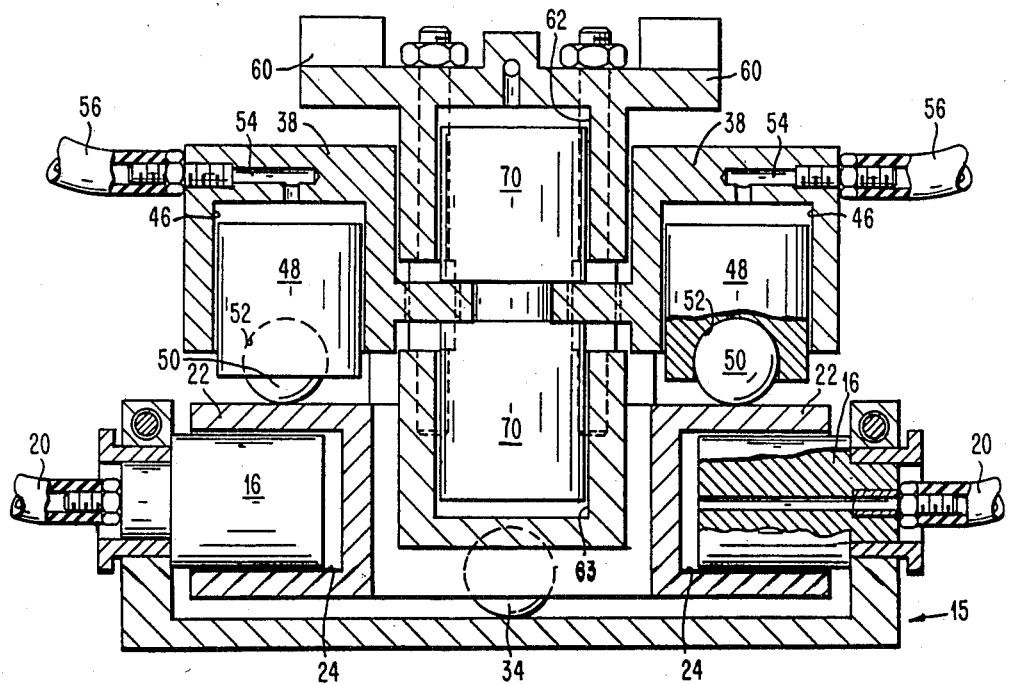
FIG. 4 is a cross-sectional view taken on line 4—4 of FIG. 3 illustrating the internal mechanism of the robot apparatus of the invention.

Referring now to FIGS. 3 and 4 of the drawings, there is illustrated the details of a preferred specific embodiment of the secondary robot 12 of the invention. Robot 12 has a mounting plate 15 on which a work holder or tool is normally affixed by suitable means not shown. As shown in FIG. 4 two opposed axially aligned pistons 16 are secured to mounting plate 15. A passageway 18 extends through each piston 16 for introducing hydraulic fluid or other types of fluid through the piston. Suitable fittings connect to a hose 20 which is in turn connected to a pump through a suitable control. A first stage platform 22 is supported on mounting plate 15 which stage can be moved both longitudinally and rotated about piston 16 which will be explained in more detail. Stage platform 22 is provided with two axially aligned outwardly facing cylinders 24 that slidably and rotatably receive pistons 16 as most clearly shown in FIG. 4. Stage 22 can be shifted in the X direction by controlling the amount of hydraulic fluid introduced through hoses 20 to cylinders 24. Pistons 16 are provided with suitable seals, not shown. Stage 22 can thus be shifted laterally by selectively introducing fluid in either one or the other of the cylinders while removing it from the opposite cylinder. Thus pistons 16 and cylinders 24 provide the support of stage 22 which allows both longitudinal movement in the X direction and also rotational movement about the X axis since the pistons 16 are free to rotate within cylinders 24. Also provided on stage 22 are two downwardly facing cylinders 26 most clearly shown in FIG. 3. The longitudinal axes of cylinders 26 are perpendicular to the longitudinal axes of cylinders 24 and are displaced on opposite sides thereof. Passages 28 in stage 22 are connected to hydraulic hoses 30 and provide a means for introducing hydraulic fluid to the interior of cylinders 26. Pistons 32 are slidably received in cylinders 26 and provide a powering means for rotating the stage 22 about the longitudinal X axis of pistons 16. As is evident the relative position of pistons 32 can be controlled by selectively introducing and withdrawing fluid from the cylinders 26. A suitable abuttment 34, as for example a ball, seated in a recess 36 provides a relatively friction free wear resistant surface for pistons 32.

A second stage 38 is supported on first stage 22 with a means to shift it in a longitudinal Y direction, and also rotate the second stage about an axis in the Y direction. Stage 22, as more clearly shown in FIG. 3, is provided with two opposed axially aligned pistons 40 very similar to pistons 16 except that they are aligned along the Y axis which is perpendicular to the axis of pistons 16. Pistons 40 are also provided with passages (not shown) that extend therethrough that are connected to hydraulic hoses 42. Second stage platform 38 is provided with cylinders 44 that face outwardly and receive pistons 40 which are in turn supported on stage 22. The combination of pistons 40 and cylinders 44 provide support for second stage platform 38 and allow it to be rotated about the Y axis and also to be shifted longitudinally along the Y axis. As is believed evident, the powering means for shifting the second stage platform 38 axially in the Y direction is provided by selectively controlling the hydraulic fluid introduced into the cylinder and piston arrangement similar to the piston-cylinder arrangement 16 and 24 in the lower stage platform and mounting plate. As more clearly shown in FIG. 4, two downwardly facing cylinders 46 are provided on stage 38. The longitudinal axis of cylinders 46 are positioned perpendicular to the longitudinal axis of pistons 40 and are displaced on either side. Received in cylinders 46 are pistons 48 each provided with an abuttment means that is wear resistant and also reduces friction. The abuttment preferably consists of a hardened steel ball 50 received in a recess 52. The ball is in abutting relation to a flat surface on lower stage platform 22 and more clearly shown in FIG. 4. Suitable passages 54 are located in second stage platform 38 that are connected by suitable fittings to hydraulic fluid conduits 56. The passages 54 provide a means of introducing fluid into cylinders 46 and therefore provide a means to rotate the second stage 38 about the Y axis as defined by the longitudinal axis of pistons 40.

Figure 5:
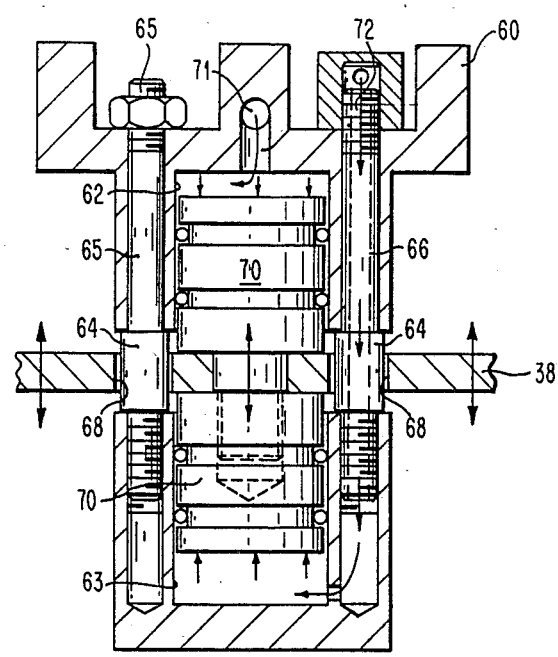
FIG. 5 is a detailed view in broken section illustrating the moving means for obtaining motion in the Z direction.

A third stage platform 60 is supported on second stage platform 38 and is free to be moved longitudinally in the Z direction as will be explained in more detail. The third stage platform is preferably mounted by a suitable means (not shown) to the end of an arm or other manipulating means of a primary robot. Normally the primary robot will be provided with a mount which will allow rotation about the Z axis. However, if the features are not provided in the primary robot, a suitable support and a means to rotate the secondary robot can be provided. Third stage platform 60 has a pair of opposed cylinders 62 and 63 supported thereon. The details of the pistons is more clearly shown in FIG. 5. Lower cylinder 63 is secured to upper cylinder 62 with bolts 65 and 66. A spacing is maintained between cylinders 62 and 63 with a spacer element 64 which is received in aperture 68 in second platform stage 38. With this arrangement, the third stage platform 60 can be moved longitudinally in the Z direction relative to second stage platform 38. Opposed pistons 70 are affixed to second stage platform 38 and are disposed in pistons 62 and 63. Passage 71 is provided to convey hydraulic fluid to the cylinder 62 and a passage 72 in bolt 66 conveys hydraulic fluid to the opposite cylinder 63. As can be seen the selective introduction of hydraulic fluid to cylinders 62 and 63 thorough the passage previously described provide for moving the third stage 60 in the Z direction relative to second stage platform 38. In use the third stage 60 is mounted on the end of a manipulator means of a primary robot.

Figure 6:
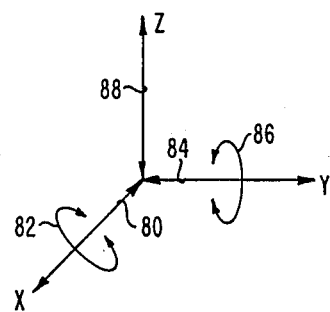
FIG. 6 is a schematic view in perspective which illustrates the degrees of motion achieved by the robot apparatus of the invention.

In FIG. 6 there is illustrated a diagram indicating the various degrees of movement achieved by the secondary robot of this invention. Arrow 80 in the X direction indicates the movement achieved by sliding the first stage platform 22 longitudinally on pistons 16. Arrow 82 indicates rotational movement about the X direction achieved by rotating the first platform 22 about pistons 16. The moving force for powering this movement are pistons 32. Arrow 84 indicates the movement achieved by sliding the second platform stage 38 relative to first platform 22 on pistons 40. Curved arrow 86 indicates the rotation movement achieved by rotating the second stage platform 32 about the axis of pistons 40. The force achieving the rotational movement are pistons 48 which abutt the first platform 22. Arrow 88 indicates the movement achieved by moving third platform stage 60 in the Z direction. The moving force for achieving this movement are pistons 70 mounted on third stage platform 60.

Figure 2:
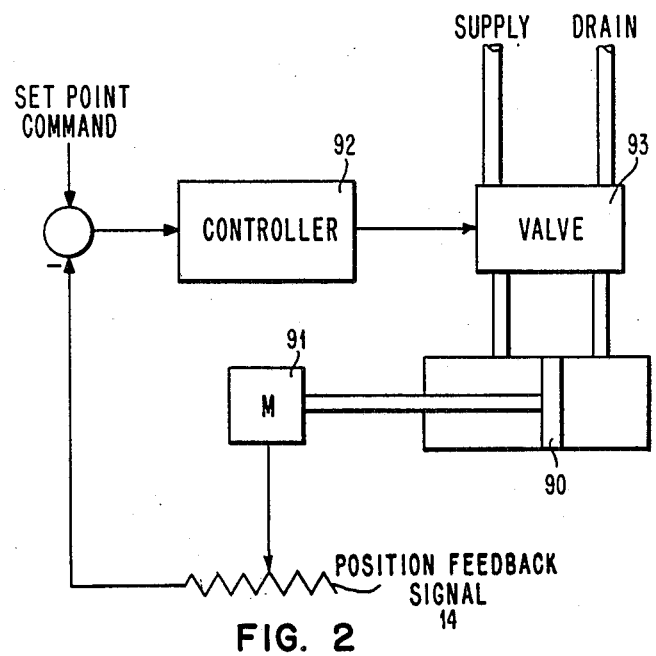
FIG. 2 is a schematic view of a typical control means used to actuate the various elements of the invention.

Referring to FIG. 2, a typical control system to achieve motion along one of the degrees of freedom of said apparatus 90 as shown is a two-way actuator representing motion provided by any of the pairs of opposing pistons. Reference 91 represents one of the stages in the apparatus. The stage is commanded to move to a desired position. The controller 92 compares the desired position with the actual position provided by the sensor 14 and issues a proper signal to a servovalve 93 which in turn directs the fluid flow to either one of the opposed pistons 90.

As is believed apparent from the foregoing description of the secondary robot 12 of the invention, the apparatus described is very compact, sturdy, and capable of achieving very precise movements. If necessary or desirable, the hydraulic system for moving the various elements could be substituted with a suitable electrical powering means, as for example linear coils operated by varying the relative amount of current introduced to each. Another potential application for the secondary robot described in this application is the use as a stage for supporting a workpiece or tool which requires its orientation to be varied and repositioned in precise locations.

While the invention has been illustrated and described with reference to preferred embodiments thereof, it is to be understood that the invention is not limited to the precise construction herein disclosed and the right is reserved to all changes and modifications coming within the scope of the invention as defined in the appended claims.

What is claimed is:

1. In a robotic apparatus which includes a primary robot provided with a manipulator means to support and displace a holder, a locating sensor to detect the relative position of said holder, the improvement comprising
    a secondary robot mounted on said manipulator means and supporting said holder, said secondary robot separately adapted to move said holder through at least five degrees of movement in response to output from said locating sensor,
    a mounting plate,
    a first stage platform movably supported on said mounting plate, a first means to support and rotate said first stage platform relative to said mounting plate about a translational axis X and also move said first stage platform longitudinally in the X direction,
    a second stage platform movably supported on said first stage platform, a second means to support and rotate said second stage platform relative to said first stage platform about a translational axis Y and also move said second stage platform longitudinally in the Y direction,
    a third stage platform movably supported on said second stage platform, a third means to support and move said third stage platform in a Z direction relative to said second stage platform
    said locating sensor providing input to control movement of said first stage platform, said second stage platform, and said third stage platform to provide a precise positioning of said holder.

2. In the robotic apparatus of claim 1 wherein a means to secure a tool holder is provided on said mounting plate.

3. In the robotic apparatus of claim 2 wherein a means to mount said secondary robot on a manipulator means of a primary robot is provided on said third stage platform.

4. In the robotic apparatus of claim 1 wherein said first means is comprised of
    a first pair of opposed, axially aligned pistons mounted on said mounting plate, a first pair of spaced, opposed, axially aligned cylinders on said first stage platform receiving said first pair of pistons and positioned so that the platform can be moved in the longitudinal axial direction of the first pair of cylinders,
    a second pair of cylinders on said first stage platform positioned perpendicular to the longitudinal axis of said first pair of cylinders and displaced laterally and on opposite sides from said longitudinal axis with the open ends facing said mounting plate,
    a second pair of pistons disposed in said second pair of cylinders with the lower ends in biasing relation to said mounting plate,
    first conduit means to convey fluid to drive said first pair of pistons to thereby shift said first stage platform in an X direction,
    second conduct means to convey fluid to drive said second pair of pistons to thereby rotate said first stage platform about the longitudinal axis of said first pair of opposed cylinders.

5. In the robotic apparatus of claim 4 wherein said second means is comprised of
    a third pair of opposed axially aligned pistons mounted on said first stage platform,
    a third pair of spaced opposed axially aligned cylinders on said second stage platform receiving said third pair of pistons and positioned so that the platform can be moved in the longitudinal axial direction of said third pair of cylinders,
    a fourth pair of cylinders on said second stage platform positioned perpendicular to the longitudinal axis of said third pair of cylinders and displaced laterally and on opposite sides from the longitudinal axis with the open ends facing said first stage platform
    a fourth pair of pistons disposed in said fourth pair of cylinders with the lower ends in biasing relation to said first stage platform,
    third conduit means to convey fluid to drive said fourth to convey fluid to drive said third pair of pistons to thereby shift said second stage platform in a Y direction,
    fourth conduit means to convey fluid to drive said fourth pair of pistons to thereby rotate said second stage platform about the longitudinal axis of said third pair of opposed cylinders.

6. In the robotic apparatus of claim 5 wherein said third means is comprised of
    a pair of opposed axially aligned pistons supported on second stage platform,
    a fifth pair of axially aligned facing cylinders supported on said third stage platform,
    fifth conduit means to convey fluid to said fifth pair of cylinders to drive said fifth pair of pistons to thereby move said third stage platform in the Z direction relative to said second stage platform.

7. A power actuated support stage robot provided with a manipulator means to support and displace a holder, a locating sensor to detect the relative position of said holder, the improvement comprising
    a mounting plate,
    a first stage platform movably supported on said mounting plate, a first means to support and rotate said first stage platform relative to said mounting plate about a translational axis X, and also move said first stage platform longitudinally in the X direction,
    a second stage platform supported on said first stage platform, a second means to support and rotate said second stage platform relative to said first stage platform about a translational axis Y, and also move said second stage platform longitudinally in the Y direction,
    said locating sensor providing input to control movement of said first stage platform, and second stage platform, to provide the precise positioning of said holder.

8. The support stage of claim 7 wherein said first means is comprised of
    a first pair of opposed, axially aligned pistons mounted on said mounting plate, a first pair of spaced, opposed, axially aligned cylinders on said first stage platform receiving said first pair of pistons and positioned so that the platform can be moved in the longitudinal axial direction of the first pair of cylinders, a second pair of cylinders on said first stage platform positioned perpendicular to the longitudinal axis of said first pair of cylinders and displaced laterally and on opposite sides from said longitudinal axis and with the open ends facing said mounting plate, a second pair of pistons disposed in said second pair of cylinders with the lower ends in biasing relation to said mounting plate, first conduit means to convey fluid to drive said first pair of pistons to thereby shift said first stage platform in an X direction, second conduit means to convey fluid to drive said second pair of pistons to thereby rotate said first stage platform about the longitudinal axis of said first pair of opposed cylinders.

9. The support stage of claim 8 wherein said second means is comprised of
- a third pair of opposed axially aligned cylinders mounted on said first stage platform receiving said third pair of pistons and positioned so that the platform can be moved in the longitudinal axial direction of said third pair of cylinders,
- a fourth pair of cylinders on said second stage platform positioned perpendicular to the longitudinal axis of said third pair of cylinders and displaced laterally and on opposite sides from the longitudinal axis with the open ends facing said first stage platform,
- a fourth pair of pistons disposed in said fourth pair of cylinders with the low ends in biasing relation to said first stage platform,
- third conduit means to convey fluid to drive said fourth conduit means to convey fluid to drive said third pair of pistons to thereby shift said second stage platform in a Y direction,
- fourth conduit means to convey fluid to drive said fourth pair of pistons to thereby rotate said second stage platform about the longitudinal axis of said third pair of opposed cylinders.

10. The support stage of claim 9 wherein said third means is comprised of
- a pair of opposed axially aligned pistons supported on second stage platform,
- a fifth pair of axially aligned facing cylinders supported on said third stage platform,
- fifth conduit means to convey fluid to said fifth pair of cylinders to drive said fifth pair pistons to thereby move said third stage platform in the Z direction relative to said second stage platform.

* * * * *